United States Patent [19]

George et al.

[11] Patent Number: 5,704,055

[45] Date of Patent: Dec. 30, 1997

[54] DYNAMIC RECONFIGURATION OF MAIN STORAGE AND EXPANDED STORAGE BY MEANS OF A SERVICE CALL LOGICAL PROCESSOR

[75] Inventors: Jonel George, Pleasant Valley; Steven Gardner Glassen, Wallkill; Matthew Anthony Krygowski, Hopewell Junction; Moon Ju Kim, Wappingers Falls; Allen Herman Preston; David Emmett Stucki, both of Poughkeepsie, all of N.Y.

[73] Assignee: International Business Machines Corporation, Armonk, N.Y.

[21] Appl. No.: 635,537

[22] Filed: Apr. 22, 1996

Related U.S. Application Data

[63] Continuation of Ser. No. 70,588, Jun. 1, 1993, abandoned.

[51] Int. Cl.$^6$ .............................. G06F 12/00; G06F 13/00
[52] U.S. Cl. ........................... 395/402; 364/DIG. 1; 364/243.2; 364/245.31; 364/246.3; 395/410
[58] Field of Search ........................... 395/401, 402, 395/410, 411, 412, 413; 364/DIG. 1, DIG. 2, 243.2, 245.31, 246.3, 228.2, 230.2

[56] References Cited

U.S. PATENT DOCUMENTS

| | | |
|---|---|---|
| 4,128,875 | 12/1978 | Thurber et al. . |
| 4,456,954 | 6/1984 | Bullions, III et al. . |
| 4,674,038 | 6/1987 | Brelsford et al. . |
| 4,695,950 | 9/1987 | Brandt et al. . |
| 4,742,450 | 5/1988 | Duvall et al. . |
| 4,754,394 | 6/1988 | Brantley, Jr. et al. ............... 395/412 |
| 4,779,188 | 10/1988 | Gum et al. . |
| 4,785,392 | 11/1988 | Maier et al. . |
| 4,792,895 | 12/1988 | Tallman . |
| 4,831,541 | 5/1989 | Eshel . |
| 4,843,541 | 6/1989 | Bean et al. . |
| 4,926,322 | 5/1990 | Stimac et al. ............... 395/425 |
| 4,945,480 | 7/1990 | Clark et al. . |
| 4,980,822 | 12/1990 | Brantley, Jr. et al. ............... 395/412 |
| 5,280,599 | 1/1994 | Arai ............... 395/425 |
| 5,341,484 | 8/1994 | Tanaka et al. ............... 395/400 |
| 5,479,631 | 12/1995 | Manners et al. ............... 395/465 |

Primary Examiner—Tod R. Swann
Assistant Examiner—Tuan V. Thai
Attorney, Agent, or Firm—Lynn L. Augspurger; Laurence J. Marhoefer

[57] ABSTRACT

A data processing system has a processing unit and a memory which provides a common pool of physical storage. This storage is initially assigned as either main storage or expanded storage during power on. Subsequent to the initial assignment, storage assigned as main storage or expanded storage may be unassigned and thus returned to the common pool. Once returned to the common pool, the storage may be reassigned as either main storage or expanded storage. The storage reassignment is done dynamically without requiring a reset action and transparent to the operating system and any active application programs.

2 Claims, 4 Drawing Sheets

DYNAMIC RECONFIGURATION OF MAIN STORAGE AND EXPANDED STORAGE BY MEANS OF A SERVICE CALL LOGICAL PROCESSOR

CROSS REFERENCE TO RELATED APPLICATION

This application is a continuation of application Ser. No. 08/070,588, filed on Jun. 1, 1993, now abandoned.

FIELD OF THE INVENTION

This invention is related to computer systems and particularly to a computer having a common physical storage which may be used as either main storage or expanded storage.

REFERENCE TO RELATED EQUIPMENT

The IBM 9121 and 9221 models provided a common physical storage from which main storage and expanded storage was assigned at power on reset time based on the user parameters. However, these models did not provide the capability of dynamically reassigning storage.

GLOSSARY OF TERMS

For convenience we will define some terms as used in this application.

Basic mode

A mode of operation of computer systems like the IBM ES/9000 where a hypervisor is not present and each operating system executes directly on the machine. ES/9000 processors have both a basic mode and an LPAR mode. In the basic mode, processors may contain one or two physical partitions, e.g. 1 megabyte. Current IBM ESA/390 system can use logical (real or virtual) addressing that addresses up to, but not beyond, 2**31 or 2 Gigabytes in any virtual space and in real memory. However, virtual space is not so limited and can be raised, e.g. U.S. patent application Ser. No. 07/816,911 filed Jan. 3, 1992 by J. G. Brenza et al and entitled "Guest Host Large Addressing Method and Means" and U.S. Pat. No. 4,355,355 to Butwell et al.

Expanded Store (ES)

Storage which is not part of the main system memory (main store) which is normally in the mainframe systems which derives from the System/370 IBM architectures which were limited to memory which may be addressed with a 32 bit arithmetic unit with 31 address bits. a.k.a. Expanded Storage

LPAR

A mode of a computer system in which physical partitions or sides may be logically segregated and each physical partition (PP) may contain many logical partitions (LPs). In LPAR mode a hypervisor is present which supports all operating systems (control programs) in all logical partitions. Under hypervisor control the logical partition may be assigned to be used by a particular process/system. LPAR is a hypervisor and in an overall system context can be referred to as the "host." Logical partitioning was first described in U.S. Pat. No. 4,564,903 entitled "Partitioned Multiprocessor Programming System" granted Jan. 14, 1986.

Main Store

Memory which is addressable by direct addressing in a computer. a.k.a. Main Storage

OS

Operating System (a.k.a. Control Program or CP.)

BACKGROUND OF THE INVENTION

Traditionally, there were two separate types of physical storage, main storage (MS) and expanded storage (ES). This has existed in data processing systems of various types, from the PC level to large parallel systems. This physical separation existed primarily due to architectural and machine absolute addressing limitations (for example, an ESA/390 machine can only address a maximum of 2 Gigabytes of main storage). However, with the advent of LPAR and future architectures and machines which may permit more than 2 Gigabytes of main storage to be addressed, existing prior art techniques for physical separation between main and extended memory do not provide an optimum storage utilization or reconfiguration capability. That is, the physical expanded storage can only be used as expanded storage and if it is not fully used by the active programs (application programs or the operating system) the unused expanded storage remains idle.

This is inefficient. It would be desirable to change the storage system to make it more flexible for operations while it is powered and operating.

SUMMARY OF THE INVENTION

By providing a common "pool" of physical storage, storage increments may be assigned as either main storage or expanded storage and the storage utilization and reconfiguration can be optimized.

When a common pool of physical storage is provided, this storage may be assigned as either main storage or expanded storage. Subsequent to the initial storage assignment, storage assigned as main storage may be reassigned as expanded storage and conversely. This storage reassignment happens dynamically, is transparent to the operating system and underlying active applications programs, and does not require a reset action.

In accordance with our invention we have provided a data processing system with a mechanism for dynamically changing the amount of main storage and expanded storage in a particular configuration, transparent to the operating system and underlying active application programs. The mechanism of the present invention applies to various data processing systems, including but not limited to, single systems, multiple systems running in logically partitioned (LPAR) mode or any other hypervisor, such as IBM's Virtual Machine (VM) operating system, and coupled systems, and as such our invention may be applied throughout the range of computer systems, from PCs, to workstations, to massively parallel systems to mainframes, as described in detail below.

DETAILED DESCRIPTION OF THE DRAWINGS

Figure 1:
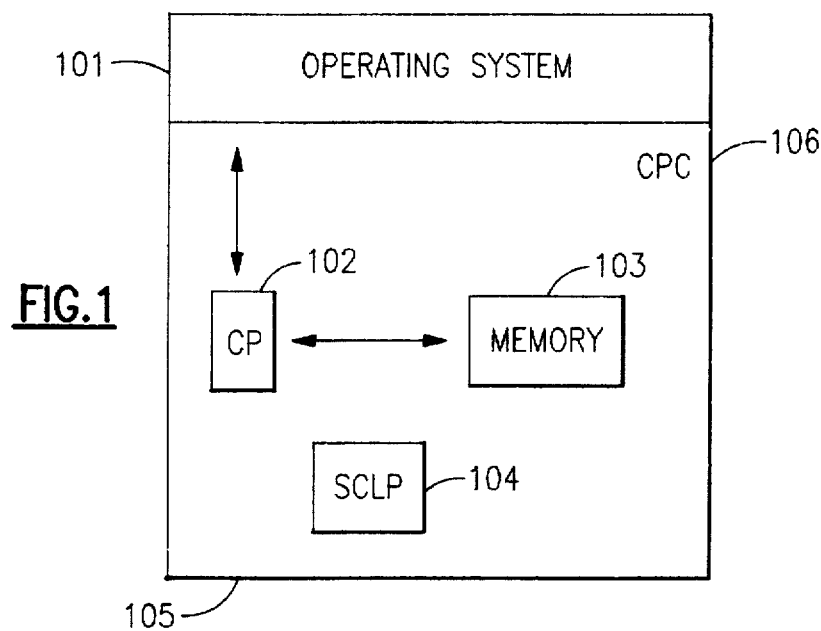
FIG. 1 shows one example of a data processing system having a single operating system, which incorporates the principles of the present invention.

When the machine is powered on or when a logical partition is activated, and a common pool of physical storage is provided, main storage and expanded storage is assigned as specified by the storage assignment parameters for the configuration (as defined by the customer prior to power on or prior to logical partition activation).

In general, storage reassignment is performed dynamically and without any disruption to the operating system or any active application programs. However, in LPAR mode the partition that storage is unassigned from may be disrupted.

The storage reassignment can be initiated by:
1. A transition from the single-image mode to the physically-partitioned mode
2. A transition from the physically-partitioned mode to the single-image mode
3. The operator
4. The program storage reconfiguration
5. Logical padition activation or deactivation in LPAR mode
6. Policy In basic mode, after the configuration is powered on, portions of main storage and expanded storage may be unassigned in multiples of increments. The unassigned increments are returned to the common storage pool. Once returned, these storage increments may be reassigned as either main storage or expanded storage.

In LPAR mode, when a logical partition is activated, main storage and expanded storage is assigned from the common storage pool as specified by the storage assignment parameters for that logical parition. After the logical partition is activated, portions of main storage and expanded storage for a logical partition may be unassigned in multiples of increments. The unassigned increments are usually returned to the common storage pool. However, the LPAR hypervisor may reassign the unassigned storage increments to another logical partition or the same logical partition, instead of returning the unassigned storage increments the common storage pool. If returned, these storage increments may be reassigned to any active logical partition or to a new logical partition as either main storage or expanded storage.

Storage reassignment is performed dynamically and without any disruption to the operating system or any active application programs.

The storage reassignment can be initiated by:
1. A transition from the single-image mode to the physically-paditioned mode
2. A transition from the physically-partitioned mode to the single-image mode
3. The operator
4. The logical partition storage reconfiguration
5. Policy FIG. 1 depicts an example of a data processing system incorporating the technique of the present invention. Referring to FIG. 1, a data processing system 105 includes one operating system 101 and one central processing complex (CPC) 106. Each of these components is described in detail below.

Central processing complex 106 may be an International Business Machines' (IBM) system following the Enterprise System Architecture/390 Principles of operation as described in IBM publication SA22-7201-00, which is hereby incorporated by reference. In one example, central processing complex 106 includes one or more central processors 102 for controlling execution of programs and the processing of data, one memory (common physical storage pool) 103 from which main storage (MS) and expanded storage (ES) are assigned, and a service call logical processor (SCLP) 104 for controlling interactions between the operating system 101 and central processing complex 106. As is known, service call logical processor (SCLP) 104 may be comprised of several hardware components and may be located within central processing complex 106, be an external unit coupled thereto or be partly located within the CPC and partly external to the CPC. In addition to the above, central processing complex 106 includes input/output (I/O) hardware and system controls (not shown).

Figure 2:
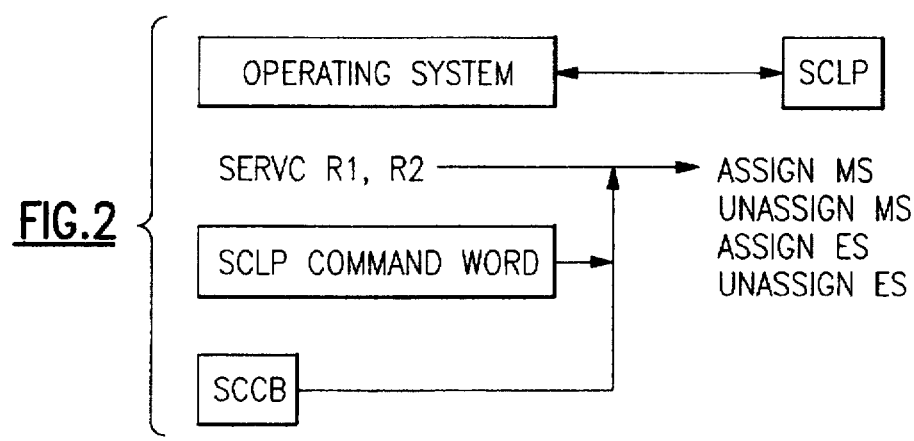
FIG. 2 shows one example of a service call logical processor command that is used to issue the assign MS, unassign MS, assign ES, and unassign ES SCLP commands.

Referring to FIG. 2, the SCLP command is issued via a service call instruction (SERVC) having two operands R1 and R2. The first operand (R1) contains a service call logical processor command word, which in this instance is the assign/unassign MS or assign/unassign ES SCLP command, and the second operand (R2) contains an absolute address of a service call control block (SCCB). The service call control block is used to pass information pertinent to a particular command from the operating system to the service call logical processor on initiation of an SCLP command and to pass information back from the service call logical processor to the operating system at the completion of the command.

Figure 3:
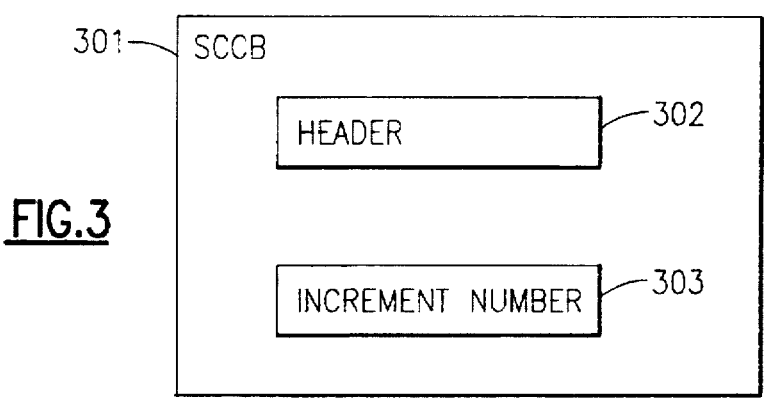
FIG. 3 shows one example of a service call control block (SCCB) used with the service call logical processor command, in accordance with the principles of the present invention.

In one example, a service call control block 301 (FIG. 3) includes a header 302 and increment number 303. Header 302 is used to provide information about service call control block 301 and, in one instance, includes a length field indicating the length of the service call control block and a service call logical processor response code. Increment number 303 is used to identify the increment that is to be assigned or unassigned.

Figure 4:
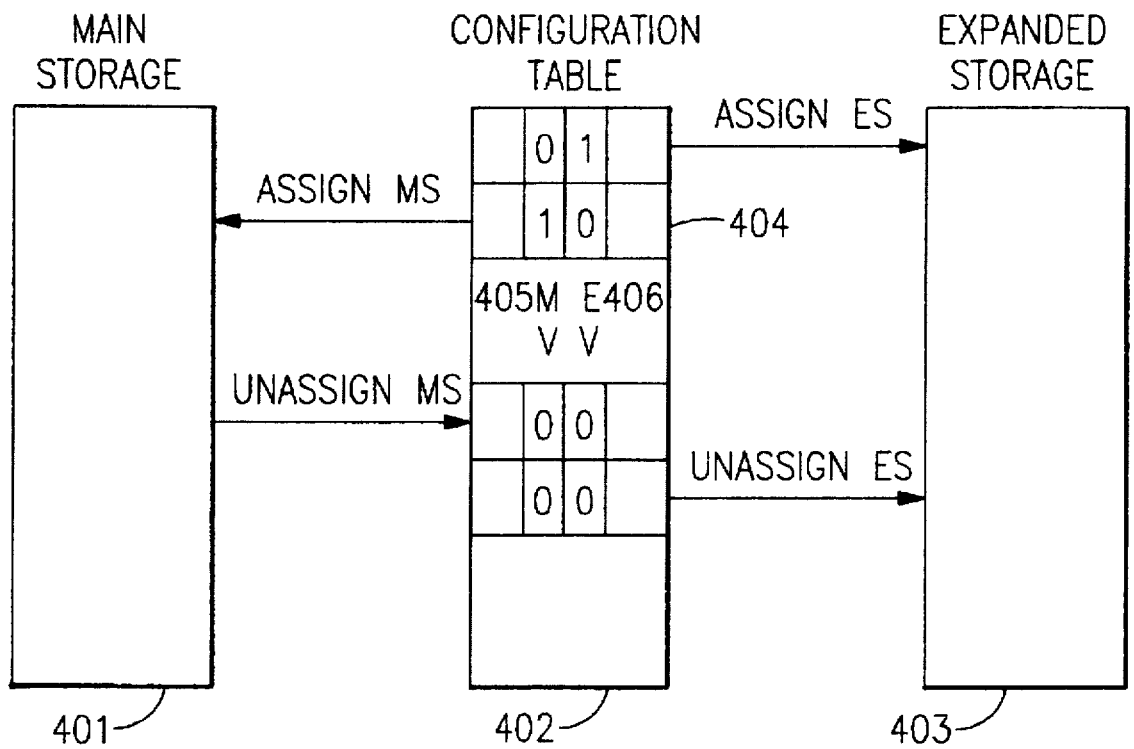
FIG. 4 shows schematically the configuration table and its usage to indicate whether a storage increment is assigned as main storage or expanded storage or not assigned.

FIG. 4 depicts the use of the configuration table 402 to map the memory (physical common storage pool) into either main storage 401, expanded storage 403, or unassigned memory. When the assign MS SCLP command is issued, assigning a storage increment as main storage 401, the SCLP changes the configuration table 402 entry corresponding to that storage increment by setting the main storage validity (MV) flag 405 to one. When the unassign MS SCLP command is issued, assigning a storage increment as main storage 401, the SCLP changes the configuration table 402 entry corresponding to that storage increment by setting the main storage validity (MV) flag 405 to zero. When the assign ES SCLP command is issued, assigning a storage increment as main storage 401, the SCLP changes the configuration table 402 entry corresponding to that storage increment by setting the expanded storage validity (EV) flag 406 to one. When the unassign ES SCLP command is issued, assigning a storage increment as main storage 401, the SCLP changes the configuration table 402 entry corresponding to that storage increment by setting the expanded storage validity (EV) flag 406 to zero. A storage increment that is has both the MV flag 405 and EV flag 406 set to zero is available for assignment as either main storage or expanded storage and may be assigned via a subsequent assign MS or assign ES SCLP command.

Figure 5:
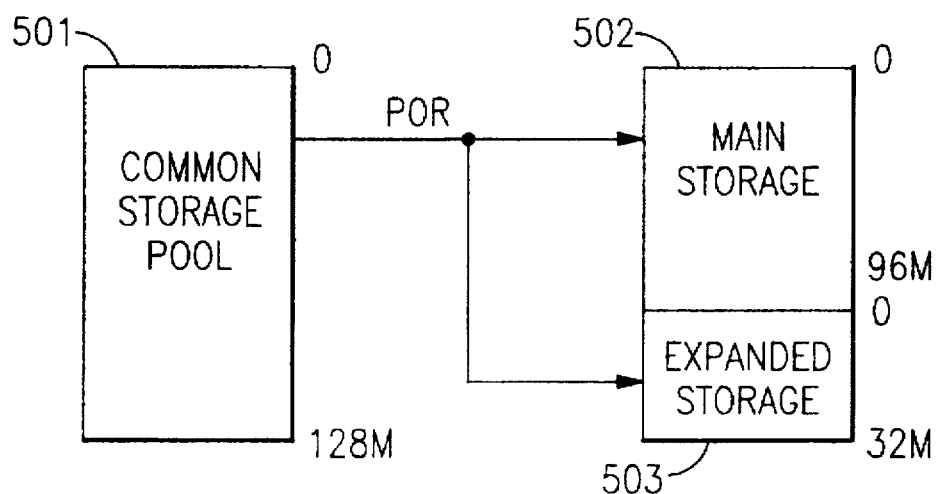
FIG. 5 shows schematically a computer having a pool of physical storage from which main storage and expanded storage are assigned at power on reset (POR) time. The storage assignment is based on the storage assignment parameters for the configuration as specified by the customer.

FIG. 5 depicts an example of prior art as implemented in the IBM model 9221. Referring to FIG. 5, a data processing system includes a common physical storage pool 501 from which main storage (MS) 502 and expanded storage (ES) 503 are assigned, based on the storage assignment parameters specified by the customer, at power on reset (POR) time. However, the limitations imposed by this prior technique were that once assigned the main storage and expanded storage could not be dynamically reassigned in a manner that was transparent to the operating system and underlying active application programs. Furthermore, only a predetermined amount (depending on the model) of the physical storage could be assigned as expanded storage.

Figure 6:
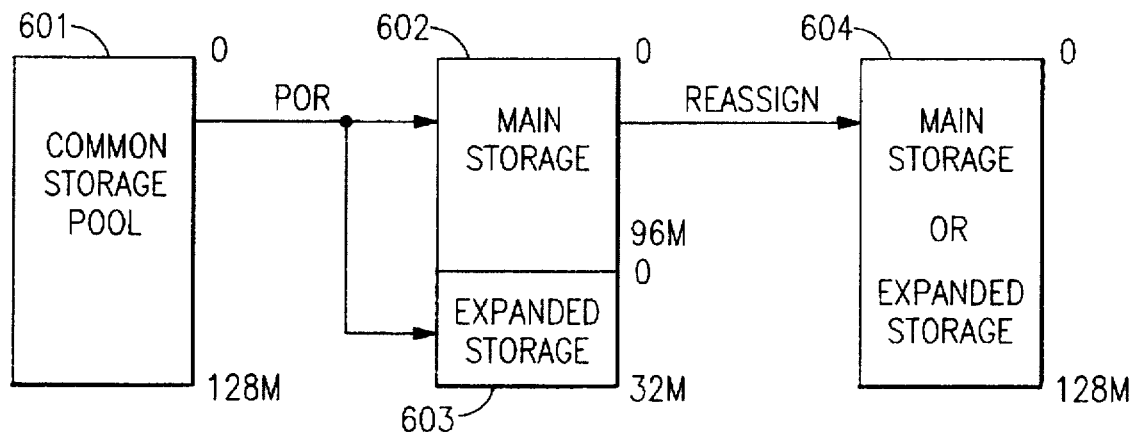
FIG. 6 shows schematically a computer, in BASIC mode, having a pool of physical storage from which main storage and expanded storage are assigned at POR time. Subsequently, the storage may be dynamically reassigned as either main storage or expanded storage. The operating system must support removal and addition of main storage and expanded storage in order for the reassignment to be transparent.

One example of a single system incorporating the technique of the present invention is depicted in FIG. 6. Referring to FIG. 6, a data processing system includes a common physical storage pool 601 from which main storage (MS) 602 and expanded storage (ES) 603 are assigned, based on the storage assignment parameters specified by the customer, at power on reset (POR) time. Subsequent to the POR, the customer (based on established policy; e.g., off-shift storage requirements), the operator (based on current workload), or the operating system (e.g., based on mode transition) can dynamically unassign some or all of main storage 602 or expanded storage 603 and reassign it as expanded storage or main storage 604 respectively.

Figure 7:
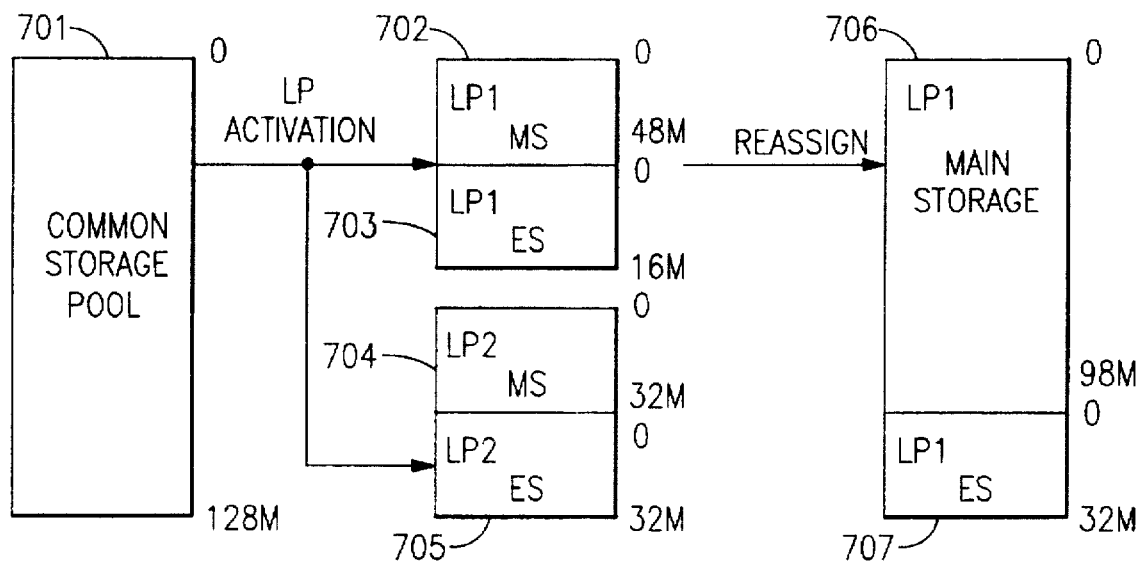
FIG. 7 shows schematically a computer, in LPAR mode, having a pool of physical storage from which main storage and expanded storage are assigned at partition activation time to multiple logical partitions. Subsequently, LP2 is deactivated and its storage is dynamically reassigned to LP1 as either main storage or expanded storage.

Another example incorporating the technique of the present invention is depicted in FIG. 7. Referring to FIG. 7, a data processing system running multiple logical partitions (LP1 and LP2) in LPAR mode and including a common physical storage pool 701 from which main storage (MS) (702, 704) and expanded storage (ES) (703, 705) for each logical partition is assigned, based on the storage assignment parameters specified by the customer, at partition activation time. Subsequent to the POR, the customer (based on established policy; e.g., test partition LP2 not required off-shift), the operator (based on current workload), or the LPAR hypervisor (e.g., based on partition deactivation) can dynamically unassign all of main storage 704 and expanded storage 705 for LP2 and reassign it as either main storage or expanded storage, or both, 706 and 707 respectively.

Figure 8:
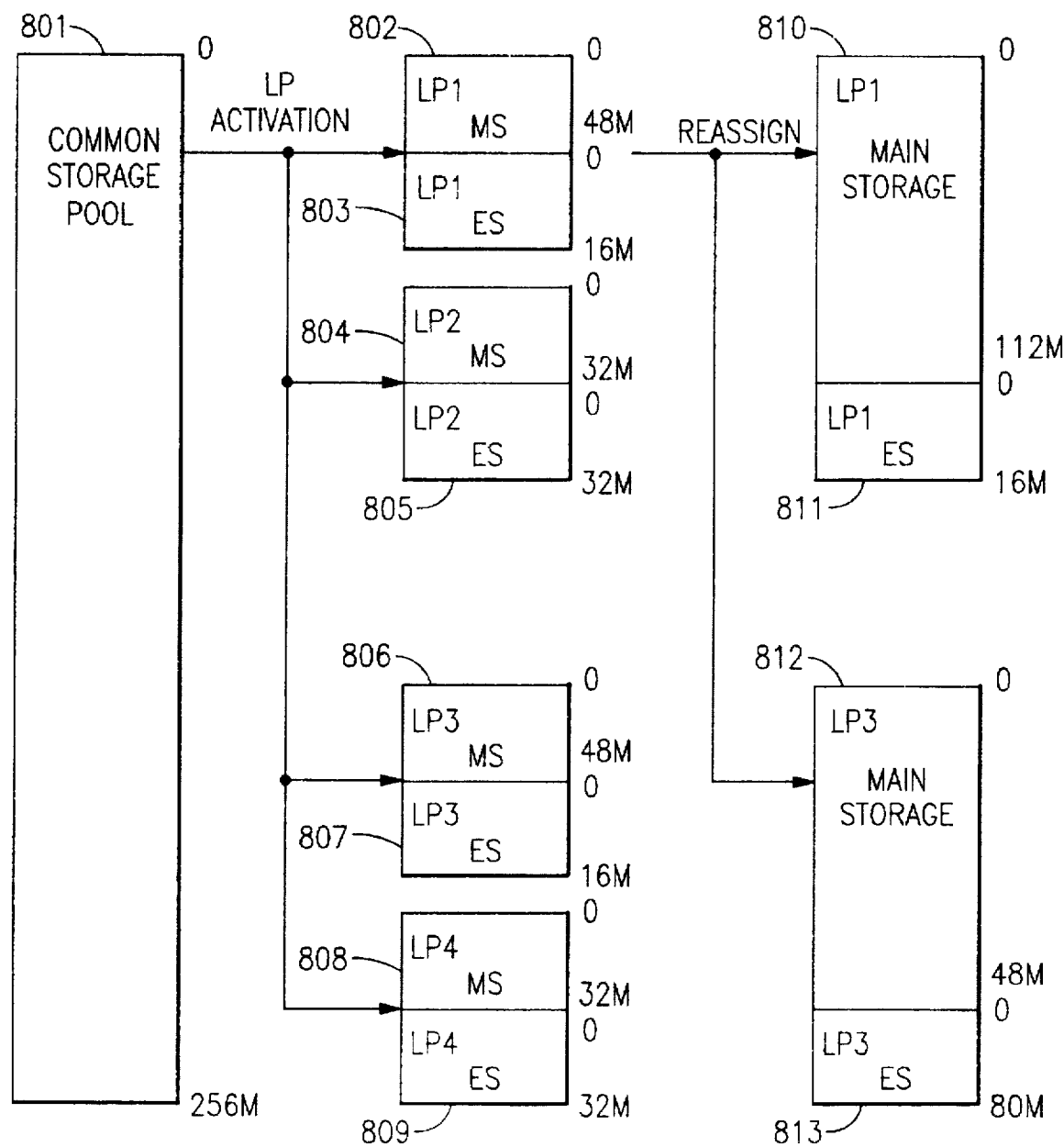
FIG. 8 shows schematically a computer, in LPAR mode, having a pool of physical storage from which main storage and expanded storage are assigned at partition activation time to multiple logical partitions. Subsequently, storage from one or more logical partitions is dynamically reassigned as either main storage or expanded storage to one or more other logical partitions.

Yet another example incorporating the technique of the present invention is depicted in FIG. 8. Referring to FIG. 8, a data processing system running a plurality of logical partitions (LP1 through L.P4) in LPAR mode and including a common physical storage pool 801 from which main storage (MS) (802, 804, 806, 808) and expanded storage (ES) (803, 805, 807, 809) for each logical partition is assigned, based on the storage assignment parameters specified by the customer, at partition activation time. Subsequent to the POR, the customer (based on established policy; e.g., LP2 and LP4 not required off-shift), the operator (based on current workload), or the LPAR hypervisor (e.g., based on partition deactivation) can dynamically unassign all of main storage (804, 808) and expanded storage (805, 809) for LP2 and LP4 and reassign it to either LP1 or LP3, or both, as either main storage or expanded storage, or both, (810, 812) and (811, 813) respectively.

While we have described our preferred embodiments of our invention, it will be understood by that those skilled in the art, both now and in the future, may make various improvements and enhancements which fall within the scope of the claims which follow. These claims should be construed to maintain the proper protection for the invention first disclosed.

What is claimed is:

1. A data processing system including a processing unit for program execution and for data processing, an operating system program for controlling the operation of said data processing system, and a service call logical processor, said data processing system comprising in combination:

a pool of increments of physical memory, from which pool, increments of main memory address locations and increments of expanded memory address locations are assigned;

a configuration table including flags which indicate the assigned status of an increment in said pool of increments of physical memory as an increment of main memory address locations, as an increment of unassigned main memory address locations, as an increment of expanded memory address locations, or as an increment of unassigned expanded memory address locations;

said service call logical processor dynamically changing an increment status in said pool of increments of physical memory by means of a service call instruction which changes a flag associated with the increment to be changed without disruption of the operating system program or any application program;

said service call instruction including an instruction for changing the status of an increment assigned as main memory address locations to the status of unassigned main memory address locations, an instruction for changing the status of an increment unassigned as main memory address locations to the status of assigned as expanded memory address locations, an instruction for changing the status of an increment assigned as expanded memory address locations to the status of unassigned expanded memory address locations, and an instruction for changing the status of an increment unassigned as expanded memory address locations to the status of assigned as main memory address locations;

wherein in hypervisor mode, when a logical partition is activated, said main memory address locations and said expanded memory address locations are assigned from the increment physical memory pool as specified by memory assignment parameters for said logical partition; and after said logical partition is activated, portions of said main memory address locations and said expanded memory address locations for said logical partition is unassigned in multiples of increments.

2. A data processing system including a processing unit for program execution and for data processing, an operating system program for controlling the operation of said data processing system, said data processing system comprising in combination:

a pool of increments of physical memory, from which pool, increments of main memory address locations and increments of expanded memory address locations are assigned;

a configuration table which indicate the assigned status of an increment in said pool of increments of physical memory as an increment of main memory address locations, as an increment of unassigned main memory address locations, as an increment of expanded memory address locations, or as an increment of unassigned expanded memory address locations;

means for dynamically changing an increment status in said pool of increments of physical memory by means of instruction which changes said configuration table for the increment to be changed without disruption of the operating system program or any application program;

said instruction including an instruction for changing the status of an increment assigned as main memory address locations to the status of unassigned main memory address locations, an instruction for changing the status of an increment unassigned as main memory address locations to the status of assigned as expanded memory address locations, an instruction for changing the status of an increment assigned as expanded memory address locations to the status of unassigned expanded memory address locations, and an instruction for changing the status of an increment unassigned as expanded memory address locations to the status of assigned as main memory address locations;

wherein in hypervisor mode, when a logical partition is activated, said main memory address locations and said expanded memory address locations are assigned from the increment physical memory pool as specified by memory assignment parameters for said logical partition; and after said logical partition is activated, portions of said main memory address locations and said expanded memory address locations for said logical partition is unassigned in multiples of increments.

\* \* \* \* \*